United States Patent [19]
Nagata et al.

[11] Patent Number: 6,089,492
[45] Date of Patent: Jul. 18, 2000

[54] PRETENSIONER FOR WEBBING RETRACTOR

[75] Inventors: Tomonori Nagata; Seiji Nishide; Seiji Hori, all of Aichi-ken, Japan

[73] Assignee: Kabushiki Kaisha Tokai-Rika-Denki-Seisakusho, Aichi-ken, Japan

[21] Appl. No.: 09/296,464

[22] Filed: Apr. 22, 1999

[30] Foreign Application Priority Data

Feb. 9, 1999 [JP] Japan .................................. 11-031864

[51] Int. Cl.$^7$ .................................................. B60R 22/46
[52] U.S. Cl. ........................... 242/374; 280/806; 60/632
[58] Field of Search ........................... 242/374; 280/806; 297/478, 480; 60/632–638

[56] References Cited

U.S. PATENT DOCUMENTS

| | | | |
|---|---|---|---|
| 5,037,134 | 8/1991 | Tabata | 280/806 |
| 5,553,890 | 9/1996 | Buhr et al. | 280/806 |
| 5,906,327 | 5/1999 | Chamings | 242/374 |

FOREIGN PATENT DOCUMENTS 9-202213  8/1997  Japan.

*Primary Examiner*—John M. Jillions
*Attorney, Agent, or Firm*—Nixon Peabody LLP; Thomas W. Cole

[57] ABSTRACT

A pretensioner for a webbing retractor is provided with a cylinder into which gas is supplied thereby moving a piston. A rack thus causes a pinion to rotate which causes a webbing to be wound onto a winding shaft. During the assembly process for the pretensioner, an O ring is fitted onto a seal holding portion of a piston and the O ring and piston are inserted together into a cylinder. Therefore, the conventional cutting process for forming a seal holding groove is unnecessary. In a normal state, the piston does not come into direct contact with the bottom portion of the cylinder, as in a conventional apparatus, instead the O ring abuts the bottom portion of the cylinder. Therefore, noise generated by the bottom of the cylinder coming into contact with the piston due to vibration and the like can be prevented.

20 Claims, 6 Drawing Sheets

PRIOR ART

FIG. 6

PRIOR ART

PRETENSIONER FOR WEBBING RETRACTOR

BACKGROUND OF THE INVENTION

1. Field of the Invention

The present invention relates to a pretensioner for a webbing retractor which removes the slackness in a webbing by forcefully winding the webbing onto a winding shaft when a vehicle executes emergency deceleration in a collision or the like.

2. Description of the Related Art

A webbing retractor is provided with a pretensioner for removing the slackness in a webbing by forcefully winding the webbing onto a winding shaft when a vehicle executes emergency deceleration in a collision or the like.

Figure 5:
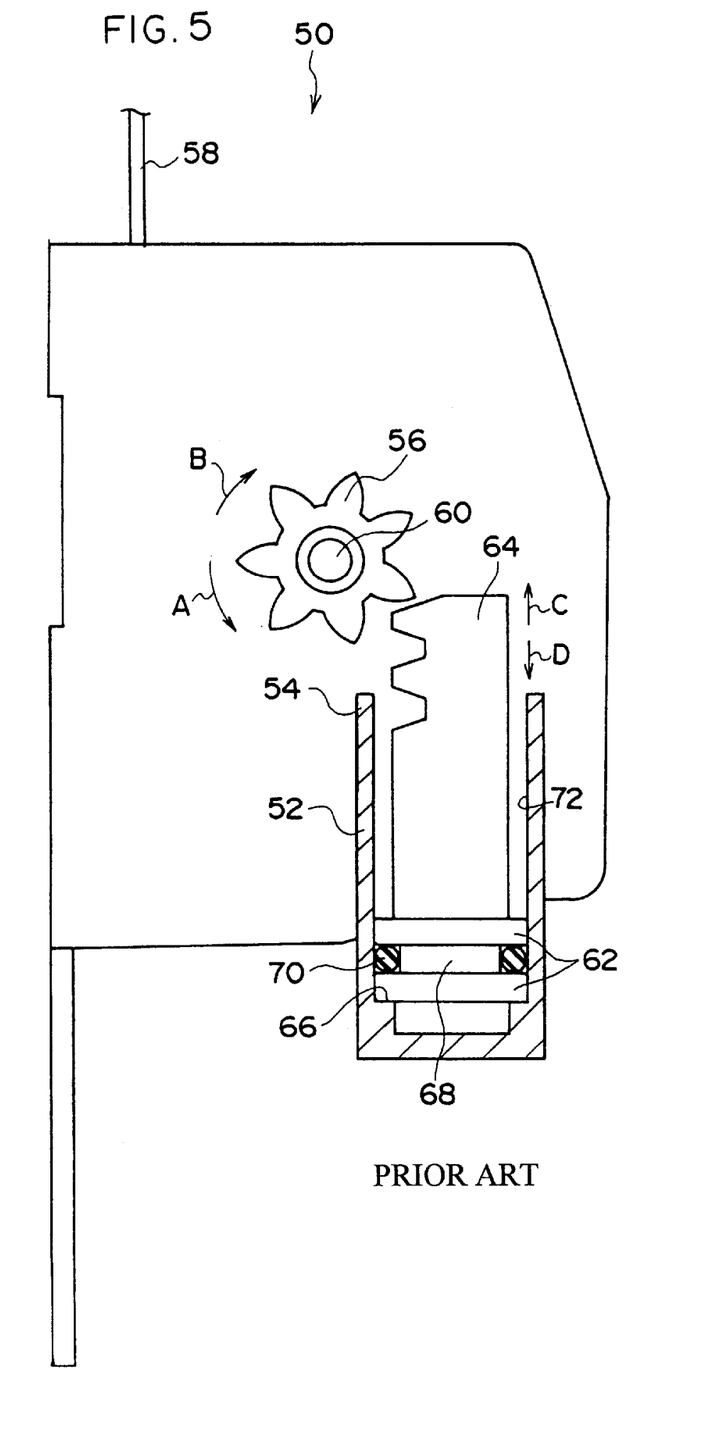
FIG. 5 is a side view showing the schematic construction of a conventional webbing retractor.

This type of pretensioner includes what is known as a rack and pinion type of pretensioner which is provided in the webbing retractor 50 shown in FIG. 5. This webbing retractor 50 is provided with a pinion 56 which is connected to a winding shaft 60 onto which the webbing 58 is wound so as to always rotate integrally with the winding shaft 60. A cylinder 52 is provided near the pinion 56 so that when the vehicle executes an emergency deceleration, gas is supplied to the inside of the cylinder 52.

A piston 62 is provided so as to be movable inside the cylinder 52. When the vehicle executes an emergency deceleration, the piston 62 is moved by the pressure of the gas in the direction of the arrow C shown in FIG. 5. A rack 64 is provided integrally with the piston 62 on the surface thereof nearest the pinion 56. The rack 64 is provided so as to move together with the piston 62 thereby meshing with the pinion 56 and causing the pinion 56 to rotate in the direction in which the webbing 58 is retracted (the direction shown by the arrow A in FIG. 5). Accordingly, in an emergency deceleration of the vehicle, the webbing 58 is wound onto the winding shaft 60 and the slackness in the webbing 58 is removed.

The piston 62 is positioned in its initial position by abutting the bottom portion 66 of the cylinder 52. A seal holding groove 68 is formed in the side surface of the piston 62 by cutting the side surface of the piston 62 and an elastic O ring 70 is mounted in the seal holding groove 68. The O ring 70 seals the gap between the piston 62 and the inner wall 72 of the cylinder 52 thereby increasing the airtightness between the piston 62 and the cylinder 52.

It should be noted that in this type of webbing retractor 50, costs are increased because of the labor required by the cutting process for forming the seal holding groove 68 and stretching the O ring 70 to fit into the seal holding groove 68 is difficult.

Because of this, in, for example, the webbing retractor 80 described in Japanese Patent Application Laid Open (JP-A) 9-202213 (refer to FIG. 6), the piston 82 has a structure where a piston body 84 and a pressure receiving plate 86 are formed separately and an O ring 88 is sandwiched between the piston body 84 and the pressure receiving plate 86. Because the O ring 88 is sandwiched between the piston body 84 and the pressure receiving plate 86, this webbing retractor 80 does not require the cutting process to form the seal holding groove 68 or the task of fitting the O ring 70 into the seal holding groove 68.

Figure 6:
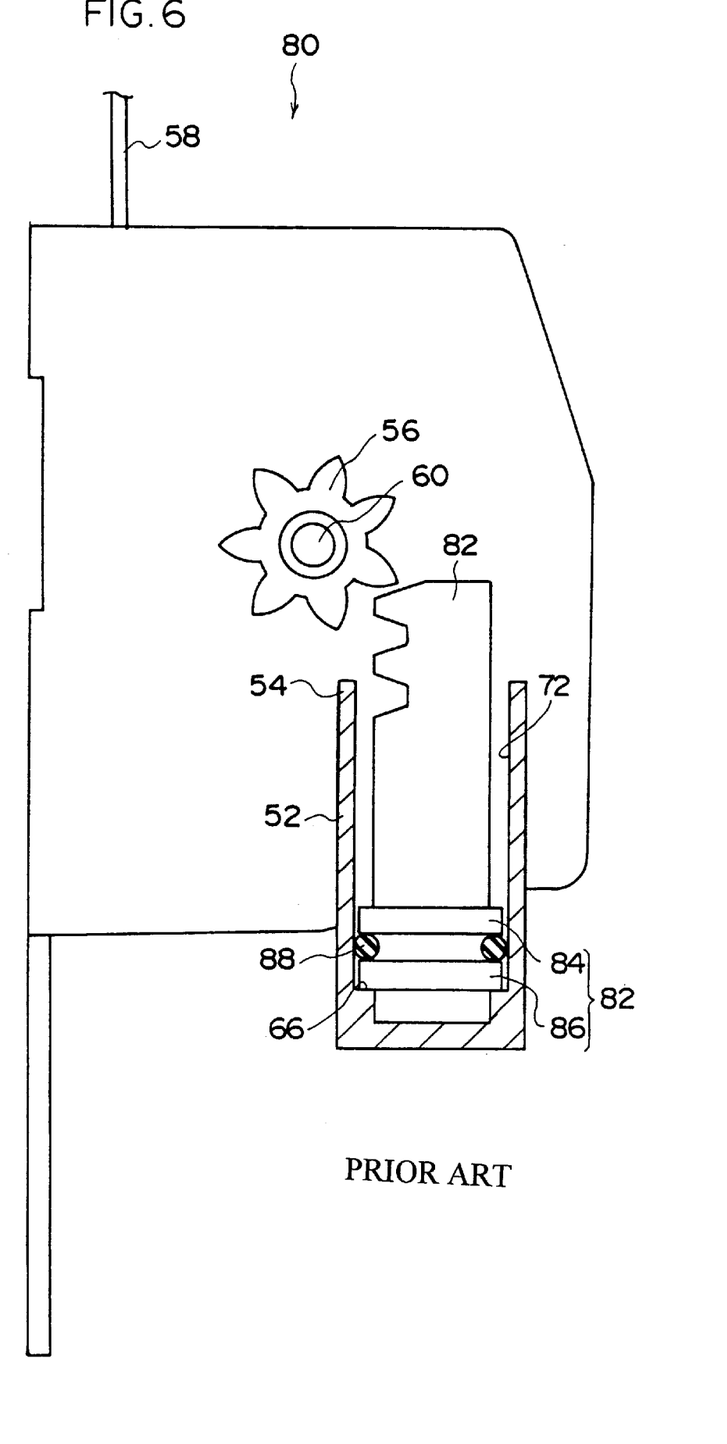
FIG. 6 is a side view showing the schematic construction of a conventional webbing retractor.

However, because the piston 82 of the webbing retractor 80 has a structure where a piston body 84 and a pressure receiving plate 86 are formed separately, the number of parts is increased thereby leading to increased costs. Moreover, there is a drawback in that a noise from the contact is generated when the bottom portion 66 of the cylinder 52 comes into contact with the pressure receiving plate 86 of the piston 82 due to vibration and the like.

Moreover, if the webbing retractor 50 shown in FIG. 5 is provided with what is known as a force limiter mechanism to prevent the load on a vehicle occupant from rising above a predetermined value when the vehicle executes an emergency deceleration, then when the force limiter operates, the pinion 56 rotates in the opposite direction to the direction in which the webbing 58 is retracted (the direction shown by the arrow B in FIG. 5) thus causing the piston 62 to move towards the bottom portion 66 of the cylinder 52 (the direction shown by the arrow D in FIG. 5) and to abut the bottom portion 66 of the cylinder 52. Therefore the pinion 56 and the rack 64 lock up and are damaged. Moreover, because the piston 62 cannot move below its initial position, there is a possibility of the operation of the force limiter being affected.

SUMMARY OF THE INVENTION

In consideration of the above, an object of the present invention is to provide a pretensioner for a webbing retractor which can prevent noise being generated by the bottom of the cylinder coming into contact with the piston due to vibration and the like, at the same time as enabling costs to be reduced.

The first aspect of the present invention is a pretensioner for a webbing retractor which comprises a winding shaft onto which a webbing is wound, a cylinder into which a fluid is supplied when a vehicle executes a sudden deceleration, a piston which is disposed so as to be able to move inside the cylinder, and which is moved inside the cylinder by the pressure of the fluid so as to rotate the winding shaft in the direction in which the webbing is retracted, a seal holding portion which is formed integrally with the surface of the piston nearest the bottom portion of the cylinder, and which protrudes in the shape of a cylinder, and a sealing member which has elastic properties, which is fitted onto the outer periphery of the seal holding portion, which seals the gap between the internal wall of the cylinder and the piston, and which abuts the bottom portion of the cylinder so as to prevent the piston and the bottom portion of the cylinder from coming into contact.

According to the first aspect of the present invention, during the assembly process of the pretensioner for a webbing retractor, a sealing member is fitted onto the external periphery of a seal holding portion formed integrally with the surface of a piston nearest to the bottom portion of a cylinder, and the sealing member is inserted together with the piston inside the cylinder. Therefore, the conventional cutting process for forming a seal holding groove is unnecessary allowing costs to be reduced. In addition, the task of fitting the O ring in the seal holding groove by stretching the O ring is unnecessary, simplifying the assembly process.

When the vehicle is being driven normally, the piston does not directly make contact with the bottom portion of the cylinder as in a conventional apparatus, but instead the sealing member abuts the bottom portion of the cylinder, thereby preventing noise of the contact between the bottom portion of the cylinder and the piston being generated by vibration and the like.

When the vehicle executes an emergency deceleration, fluid is supplied to the cylinder and the piston is moved by the pressure of the fluid. When the piston is moved, the winding shaft is rotated in the direction in which the webbing is retracted and the webbing is wound onto the winding shaft, resulting in the slackness in the webbing being removed. At this point, when the piston is moved by the pressure of the fluid, the pressure of the fluid acts on the sealing member. The sealing member is thus unable to move from the seal holding portion because it is held in place by the piston. Therefore, the sealing member seals the gap between the piston and the inner wall of the cylinder thus increasing the air-tightness between the piston and the cylinder.

When this type of webbing retractor equipped with a pretensioner is further provided with a force limiter, then when the force limiter is operated, the winding shaft is rotated in the opposite direction to the direction in which the webbing is retracted, thereby unwinding the webbing. Accordingly, the load on a vehicle occupant in an emergency deceleration is prevented from rising above a predetermined value. At this point, because the winding shaft is rotated in the opposite direction to the direction in which the webbing is retracted, then even if the piston moves in the direction of the bottom portion of the cylinder, the sealing member abuts the bottom portion of the cylinder preventing the piston from directly contacting the bottom portion of the cylinder. Accordingly, no noise is generated by the bottom portion of the cylinder contacting the piston.

Further, when the sealing member abuts the bottom portion of the cylinder, due to its elastic properties, the sealing member is slightly squashed. Accordingly, because the piston is able to move below its initial position, it can be prevented from having any effect on the operation of the force limiter.

Further to this, because the piston of the first aspect of the present invention is not constructed with a separate piston body and pressure receiving plate as in a conventional apparatus, the number of parts is reduced, thereby allowing costs to be reduced As described above, according to the first aspect of the present invention, ease of assembly is improved thereby reducing costs and the generation of noise from contact between the bottom portion of the cylinder and the piston caused by vibration and the like can be prevented.

The second aspect of the present invention is a pretensioner for a webbing retractor according to the first aspect of the present invention, wherein a concave portion corresponding to the seal holding portion is provided in the bottom portion of the cylinder and the concave portion is formed with sufficient depth that, when the sealing member is in an elastically deformed state, the seal holding portion does not come into contact with the bottom wall of the concave portion.

According to the second aspect of the present invention, a concave portion is provided in the bottom portion of the cylinder having a sufficient depth that when the sealing member is in an elastically deformed state, the seal holding portion does not come into contact with the bottom wall of the concave portion. Therefore, when the force limiter is operated, the piston is ensured of being able to move below its initial position thereby effectively preventing the piston from affecting the operation of the force limiter.

DESCRIPTION OF THE PREFERRED EMBODIMENTS

Figure 1:
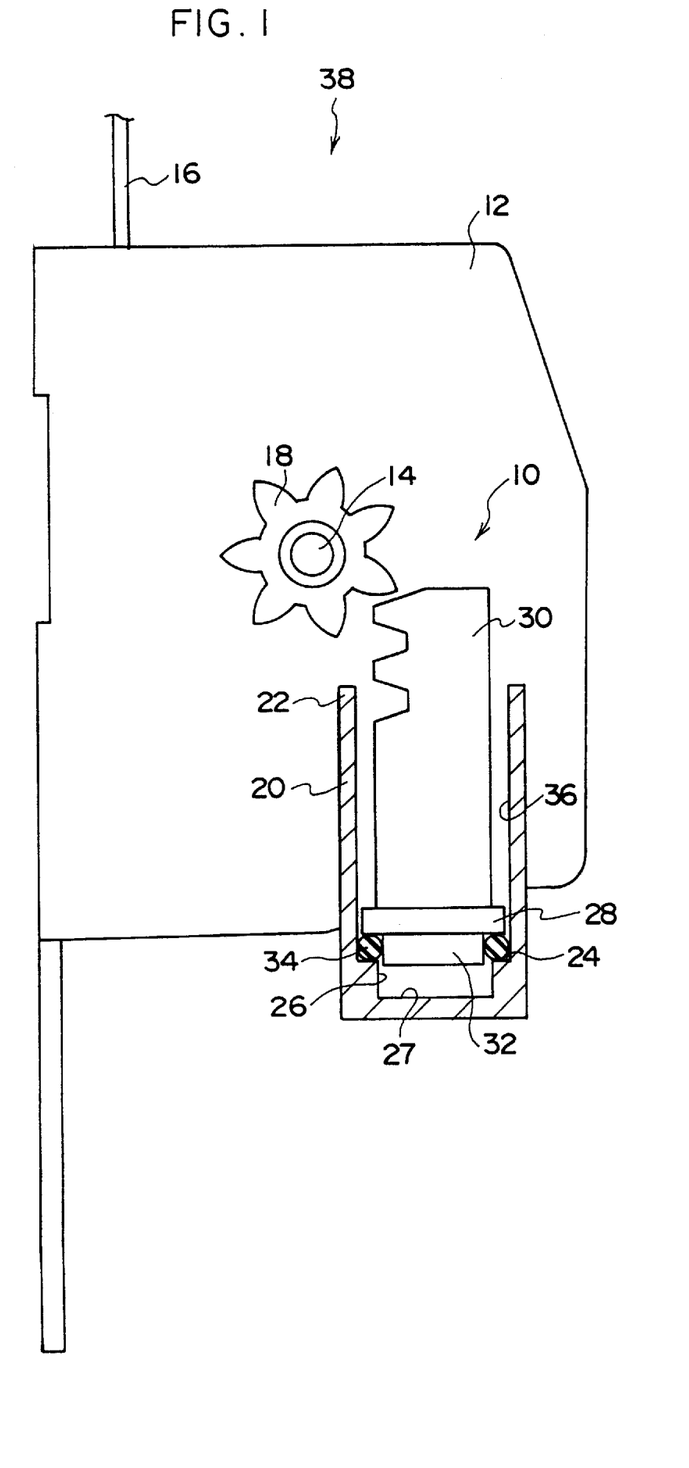
FIG. 1 is a side view showing the schematic structure of the webbing retractor of an embodiment of the present invention.
Figure 2:
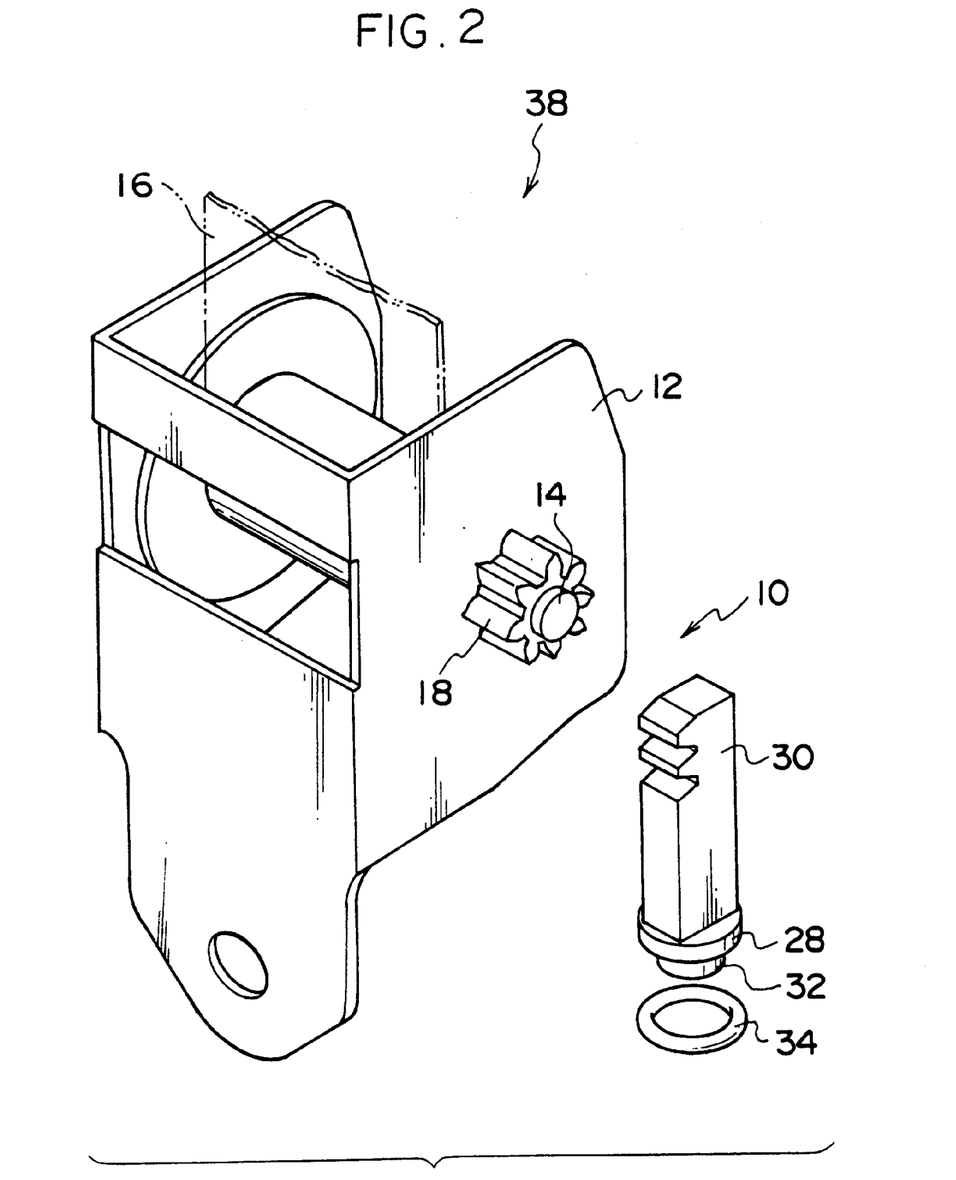
FIG. 2 is an exploded perspective view showing the schematic structure of a webbing retractor.

FIG. 1 shows a side view of the schematic construction of a webbing retractor 38 constructed using the pretensioner 10 for a webbing retractor of an embodiment of the present invention. FIG. 2 shows an exploded perspective view of the schematic construction of the webbing retractor 38.

The webbing retractor 38 is provided with a frame 12 which is fixed to a vehicle. A winding shaft 14 is fixed to the frame 12 so as to be rotatable therewithin and a webbing 16 is wound onto the winding shaft 14.

The webbing retractor 38 is further provided with a rack and pinion type of pretensioner 10 and the pinion 18 is connected to one end of the winding shaft 14. The pinion 18 is disposed so as to always rotate integrally with the winding shaft 14 and, therefore, the winding shaft 14 is rotated by the rotation of the pinion 18 resulting in the webbing 16 being either wound onto or unwound from the winding shaft 14.

A cylinder 20 is fixed to the frame 12. The cylinder 20 is formed in a hollow cylindrical shape with the distal end 22 of the cylinder 20 open in the vicinity of the pinion 18. In contrast, a cylindrical concave portion 26 is provided in the bottom portion 24 of the cylinder 20. This concave portion 26 is made with a smaller diameter than the internal diameter of the cylinder 20 so that the bottom portion 24 of the cylinder 20 and the concave portion 26 form a step which is used for positioning an O ring 34, which is described below, and holding the O ring 34 in position. Moreover, an unillustrated gas supply aperture is provided in the concave portion 26 from which a gas serving as a fluid is supplied into the cylinder 20 when a vehicle executes an emergency deceleration due to a collision or the like.

A substantially disc-shaped piston 28 is provided so as to be able to move inside the cylinder 20. Accordingly, when gas is supplied to the inside of the cylinder 20, the gas pressure causes the piston 28 to move in the direction of the arrow C in FIG. 3.

A rack 30 is provided integrally with the surface of the piston 28 nearest the pinion 18. The rack 30 matches the pinion 18 and when the rack 30 is moved together with the piston 28 in the direction of the arrow C in FIG. 3, the rack 30 meshes with the pinion 18 and causes the pinion 18 to rotate in the direction in which the webbing 16 is retracted (the direction of the arrow A in FIG. 3).

A cylindrically-shaped seal holding portion 32 is formed integrally with the surface of the piston 28 nearest the bottom portion 24 of the cylinder 20. An O ring 34 is fitted onto the external periphery of the seal holding portion 32 as a sealing member. The O ring 34 has elastic properties and seals the gap between the piston 28 and the internal wall 36 of the cylinder 20.

The O ring 34 abuts the bottom portion 24 of the cylinder 20 so as not to allow the piston 28 to come into direct contact with the bottom portion 24 of the cylinder 20. The position of the piston 28 in this state is the initial position of the piston 28. In this normal state where the O ring 34 abuts the bottom portion 24 of the cylinder 20, the seal holding portion 32 is positioned inside the aforementioned concave portion 26 of the bottom portion 24 of the cylinder 20. Moreover, the concave portion 26 is formed with sufficient depth that, when the O ring 34 is in an elastically deformed state, the seal holding portion 32 does not come into contact with the bottom wall 27 of the concave portion 26.

The above-described type of webbing retractor 38 provided with the pretensioner 10 using a rack and pinion is further provided with an unillustrated force limiter mechanism. When the force limiter is operated, the pinion 18 rotates in the opposite direction to the direction in which the webbing 16 is retracted (the direction shown by the arrow B in FIG. 4) thereby unwinding the webbing 16. Accordingly, when the vehicle executes an emergency deceleration, the load on the vehicle occupant does not exceed a predetermined value.

The operation of the present embodiment will now be explained.

During the assembly process for the pretensioner 10 of the webbing retractor 38 having the above-described structure, an O ring 34 is fitted onto the external periphery of a seal holding portion 32 formed integrally with the surface of the piston 28 nearest the bottom portion 24 of the cylinder 20. The piston 28 is inserted into the cylinder 20 together with the O ring 34. Therefore, the conventional cutting process for forming a seal holding groove is unnecessary, allowing costs to be reduced. In addition, the task of fitting the O ring in the seal holding groove by stretching the O ring is unnecessary, simplifying the assembly process.

When the vehicle is being driven normally, the piston 28 does not directly come into contact with the bottom portion 24 of the piston 20 as in a conventional apparatus, but instead the O ring 34 abuts the bottom portion 24 of the cylinder 20, thereby preventing noise of the contact between the bottom portion 24 of the cylinder 20 and the piston 28 being generated by vibration and the like.

Figure 3:
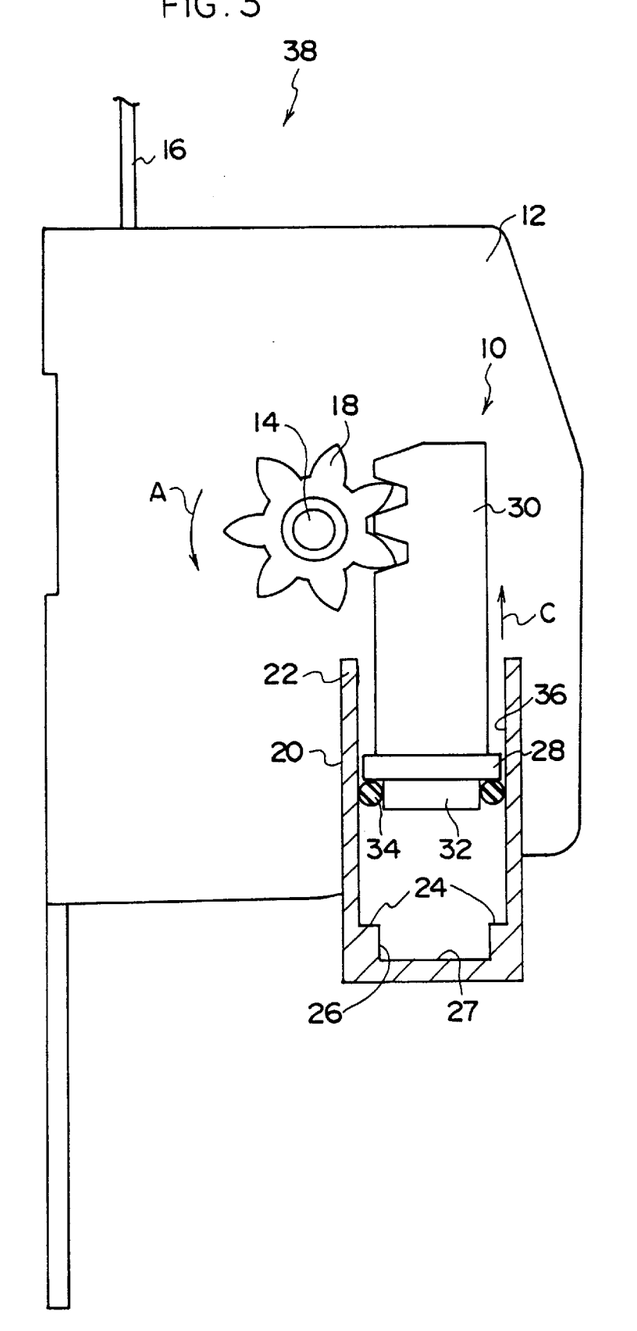
FIG. 3 is a side view showing the operation of a pretensioner for a webbing retractor.

When the vehicle executes an emergency deceleration, then, as is shown in FIG. 3, gas is supplied to the cylinder 20 and the piston 28 is moved in the direction shown by the arrow C in FIG. 3 by the pressure of the gas. When the piston 28 is moved in the direction of the arrow C in FIG. 3, the rack 30 moves together with the piston 28 and meshes with the pinion 18, rotating the pinion 18 in the direction in which the webbing 16 is retracted (the direction shown by the arrow A in FIG. 3). When the pinion 18 is rotated in the direction in which the webbing 16 is retracted, the webbing is wound onto the winding shaft 14, thereby removing the slackness in the webbing 16. At this point, when the piston 28 is moved by the pressure of the gas, the pressure of the gas acts on the O ring 34. The O ring 34 is unable to move from the seal holding portion 32 because it is held in place by the piston 28. Therefore, the O ring 34 seals the gap between the piston 28 and the inner wall 36 of the cylinder 20 thus increasing the air-tightness between the piston 28 and the cylinder 20.

Figure 4:
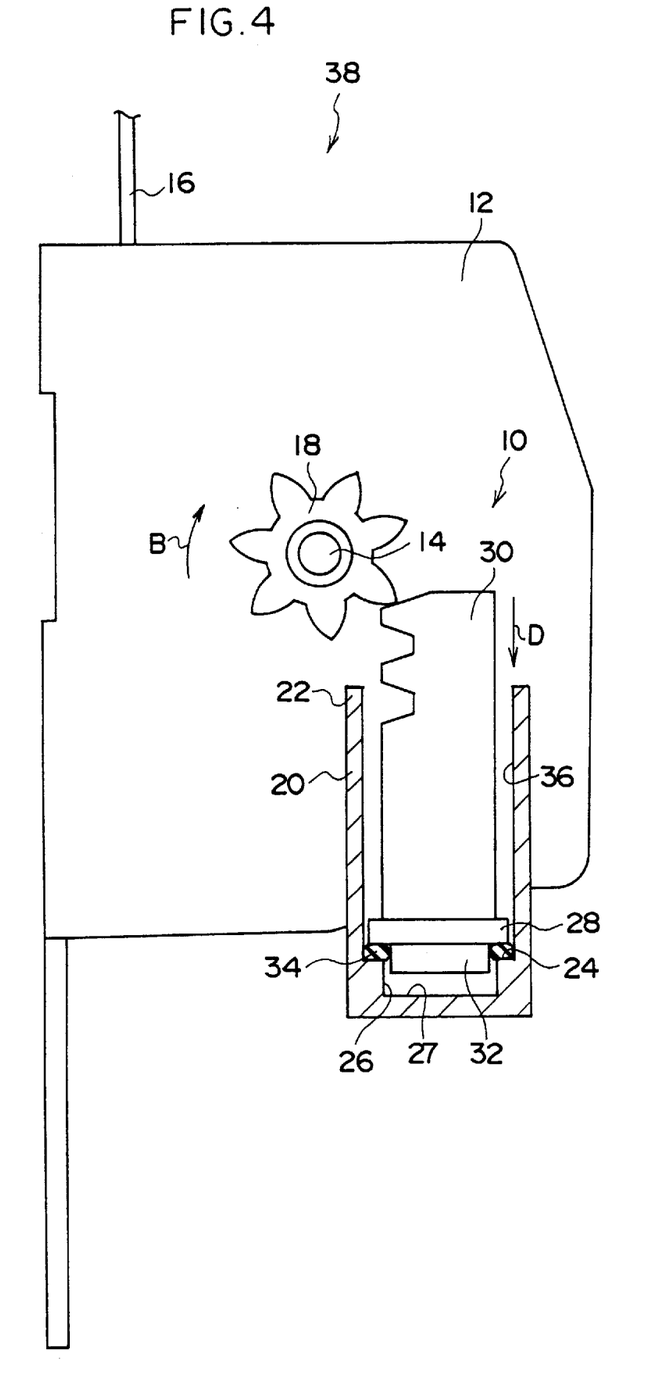
FIG. 4 is a side view showing the operation of a force limiter for a webbing retractor.

When the force limiter is operated, then, as is shown in FIG. 4, the pinion 18 is rotated in the opposite direction to the direction in which the webbing 16 is retracted (the direction shown by the arrow B in FIG. 4), thereby unwinding the webbing 16. Accordingly, the load on a vehicle occupant in an emergency deceleration is prevented from rising above a predetermined value. At this point, because the pinion 18 is rotated in the opposite direction to the direction in which the webbing 16 is retracted, then even if the piston 28 moves in the direction of the bottom portion 24 of the cylinder 20 (the direction shown by the arrow D in FIG. 4), the O ring 34 abuts the bottom portion 24 of the cylinder 20 preventing the piston 28 from making direct contact with the bottom portion 24 of the cylinder 20. Accordingly, no noise is generated by the bottom portion 24 of the cylinder 20 contacting the piston 28.

Further, when the O ring 34 abuts the bottom portion 24 of the cylinder 20, due to its elastic properties, the O ring 34 is slightly squashed. At this point, with the O ring 34 thus elastically deformed, the seal holding portion 32 does not come into contact with the bottom wall 27 of the concave portion 26 of the bottom portion 24 of the cylinder 20. Accordingly, the pinion 18 and the rack 30 can be prevented from locking up and being damaged. Moreover, because the piston 28 is able to move below its initial position, it can be prevented from having any effect on the operation of the force limiter.

Further to this still, because the piston of the present embodiment is not structured with a separate piston body and pressure receiving plate as in the conventional apparatus, the number of parts is reduced, thereby allowing costs to be reduced.

As described above, in the webbing retractor 38 of the present embodiment, costs are able to be reduced and the generation of noise from contact between the bottom portion 24 of the cylinder 20 and the piston 28 caused by vibration and the like can be prevented.

What is claimed is:

1. A pretensioner for a webbing retractor comprising:
   a winding shaft onto which a webbing is wound;
   a cylinder into which a fluid is supplied when a vehicle makes a sudden deceleration;
   a piston which is disposed so as to be able to move inside said cylinder, and which is moved inside said cylinder by the pressure of said fluid so as to rotate said winding shaft in the direction in which said webbing is retracted;
   a seal holding portion which is formed integrally with the surface of said piston nearest the bottom portion of said cylinder, and which protrudes in the shape of a cylinder;
   and a sealing member which has elastic properties, which is fitted onto the external periphery of said seal holding portion, which seals the gap between the internal wall of said cylinder and said piston, and which abuts said bottom portion of said cylinder so as to prevent said piston and said bottom portion of said cylinder from coming into contact.

2. A pretensioner for a webbing retractor according to claim 1, wherein a concave portion corresponding to said seal holding portion is provided in said bottom portion of said cylinder and said concave portion is formed with sufficient depth that, when said sealing member is in an elastically deformed state, said seal holding portion does not come into contact with the bottom wall of said concave portion.

3. A pretensioner for a webbing retractor according to claim 1, wherein said fluid is a gas.

4. A pretensioner for a webbing retractor according to claim 1, wherein a pinion which always rotates integrally with said winding shaft is joined to one end of said winding shaft.

5. A pretensioner for a webbing retractor according to claim 1, wherein a rack is provided integrally with said piston.

6. A pretensioner for a webbing retractor according to claim 1, wherein said sealing member is an O ring.

7. A pretensioner for a webbing retractor according to claim 1, wherein a force limiter mechanism is provided to prevent the load on an occupant of a vehicle from rising above a predetermined value when said vehicle executes an emergency deceleration.

8. A pretensioner for a webbing retractor according to claim 2, wherein said fluid is a gas.

9. A pretensioner for a webbing retractor according to claim 2, wherein a pinion which always rotates integrally with said winding shaft is joined to one end of said winding shaft.

10. A pretensioner for a webbing retractor according to claim 2, wherein a rack is provided integrally with said piston.

11. A pretensioner for a webbing retractor according to claim 2, wherein said sealing member is an O ring.

12. A pretensioner for a webbing retractor according to claim 2, wherein a force limiter mechanism is provided to prevent the load on an occupant of a vehicle from rising above a predetermined value when said vehicle executes an emergency deceleration.

13. A pretensioner for a webbing retractor according to claim 4, wherein a rack is provided integrally with said piston.

14. A pretensioner for a webbing retractor according to claim 9, wherein a rack is provided integrally with said pinion.

15. A pretensioner for a webbing retractor according to claim 13, wherein said rack moves together with said piston, meshes with said pinion, and causes said pinion to rotate thereby causing said winding shaft to rotate in the direction in which said webbing is retracted.

16. A pretensioner for a webbing retractor according to claim 14, wherein said rack moves together with said piston, meshes with said pinion, and causes said pinion to rotate thereby causing said winding shaft to rotate in the direction in which said webbing is retracted.

17. A pretensioner for a webbing retractor comprising:
 a winding shaft onto which a webbing is wound and to one end of which a pinion is connected and which always rotates integrally with said pinion;
 a cylinder into which gas is supplied when a vehicle makes a sudden deceleration;
 a piston which is disposed so as to be able to move inside said cylinder, which is provided integrally with a rack, and which is moved inside said cylinder by the pressure of said gas so that said rack meshes with said pinion and causes said pinion to rotate, thereby causing said winding shaft to rotate in the direction in which said webbing is retracted;
 a seal holding portion which is formed integrally with the surface of said piston nearest the bottom portion of said cylinder, and which protrudes in the shape of a cylinder;
 and a sealing member which has elastic properties, which is fitted onto the external periphery of said seal holding portion, which seals the gap between the internal wall of said cylinder and said piston, and which abuts said bottom portion of said cylinder so as to prevent said piston and said bottom portion of said cylinder from coming into contact.

18. A pretensioner for a webbing retractor according to claim 17, wherein a concave portion corresponding to said seal holding portion is provided in said bottom portion of said cylinder and said concave portion is formed with sufficient depth that, when said sealing member is in an elastically deformed state, said seal holding portion does not come into contact with the bottom wall of said concave portion.

19. A pretensioner for a webbing retractor according to claim 17, wherein said sealing member is an O ring.

20. A pretensioner for a webbing retractor according to claim 17, wherein a force limiter mechanism is provided to prevent the load on an occupant of a vehicle from rising above a predetermined value when said vehicle executes an emergency deceleration.

* * * * *